United States Patent [19]

Price et al.

[11] 4,119,161

[45] Oct. 10, 1978

[54] AUTOMATIC OPERATING SYSTEM FOR LEVER TYPE POSTAGE METERING MACHINE

[75] Inventors: Robert John Price, El Cajon; Lawrence Joseph Kamm, San Diego, both of Calif.

[73] Assignee: Orbitran Company, Inc., Lakeside, Calif.

[21] Appl. No.: 761,728

[22] Filed: Jan. 24, 1977

[51] Int. Cl.$^2$ ............................................. G01G 19/413
[52] U.S. Cl. ........................................... 177/3; 177/13; 235/101
[58] Field of Search .......... 177/25, 3, 13, 30, DIG. 3; 346/9–12; 235/101

[56] References Cited

U.S. PATENT DOCUMENTS

| | | | |
|---|---|---|---|
| 3,057,547 | 10/1962 | Adler | 235/101 X |
| 3,477,528 | 11/1969 | Schmollinger | 177/3 |

*Primary Examiner*—Joseph W. Hartary
*Attorney, Agent, or Firm*—Brown & Martin

[57] ABSTRACT

The system is responsive to a signal from a weight computer to selectively move levers on a lever type postage metering machine to postage selecting positions corresponding to computed postage. The system includes a plurality of actuating members with connecting members for embracing the tabs on the ends of the postage selecting or setting levers of the metering machine for moving the levers to the selected positions. The connecting members follow the natural motion of the tabs on the postage selecting levers. The operating members are moved to their selective positions by alternating rotating discs controlled by an alternately driven motor, which is driven in response to a signal from the weight computer with a comparator circuit for comparing and selecting the respective positions of the discs. The discs contain code position indicators which are sensed by code sensing means connected to the computer for operating a latch system for selectively latching and unlatching the respective discs, for permitting them to be driven to selected positions for actuating the postage meter levers.

13 Claims, 9 Drawing Figures

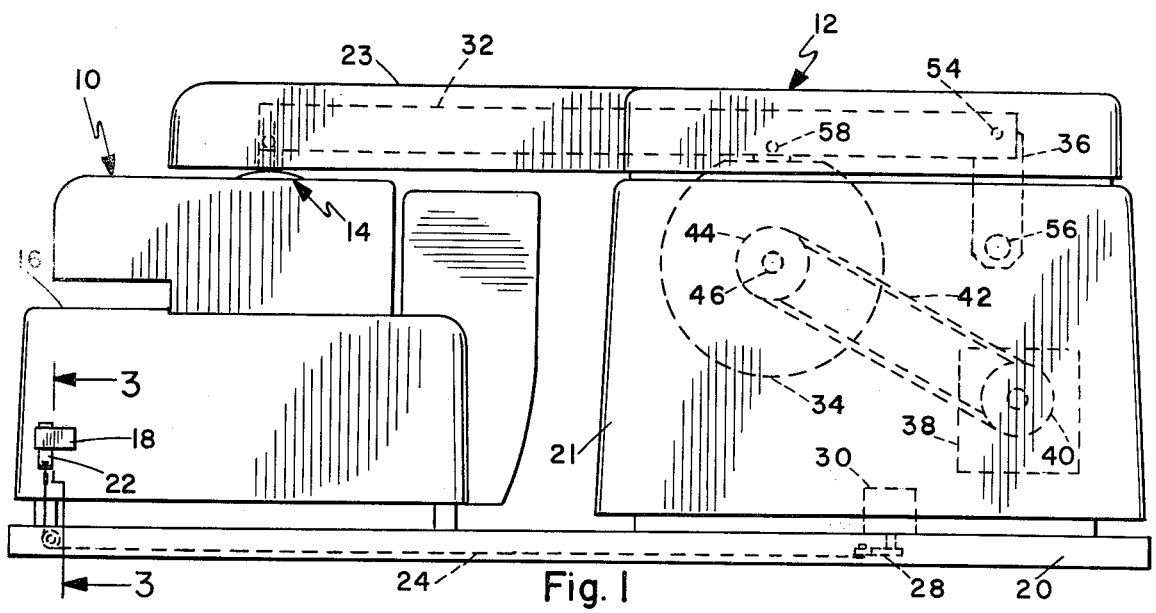
Fig. 1
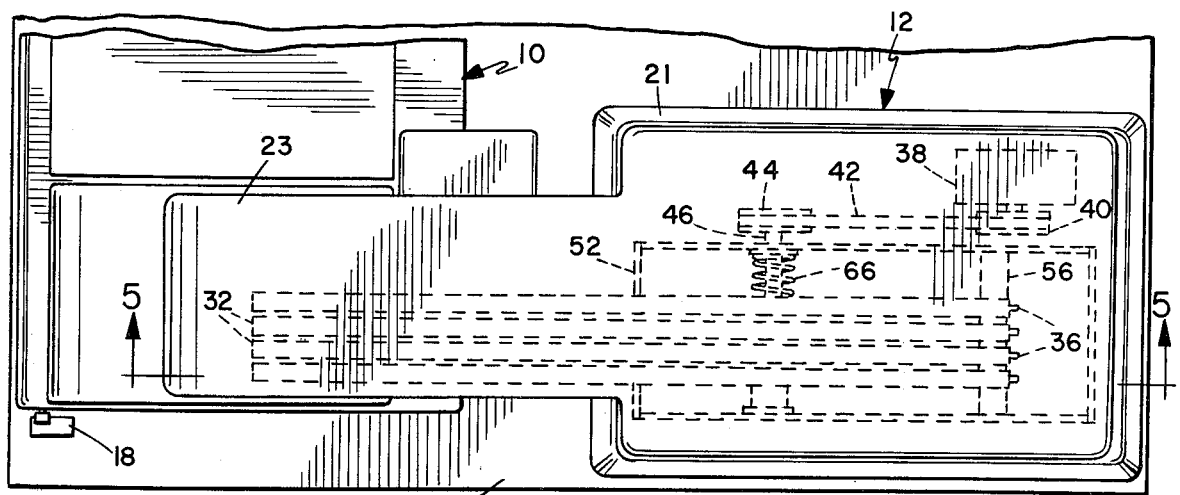
Fig. 2
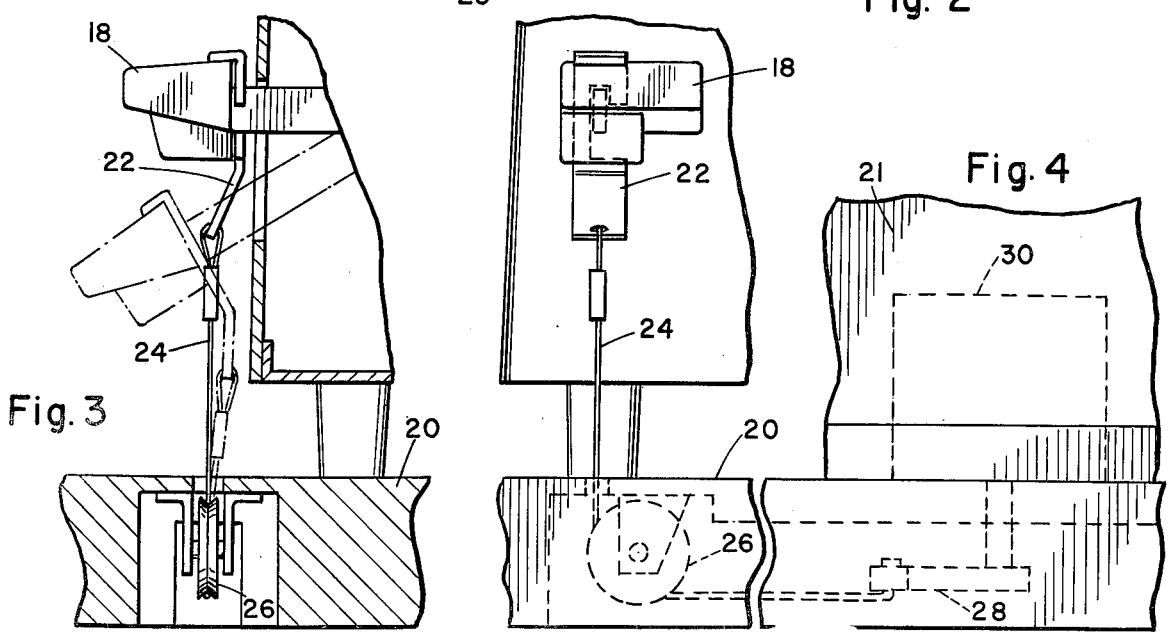
Fig. 3
Fig. 4

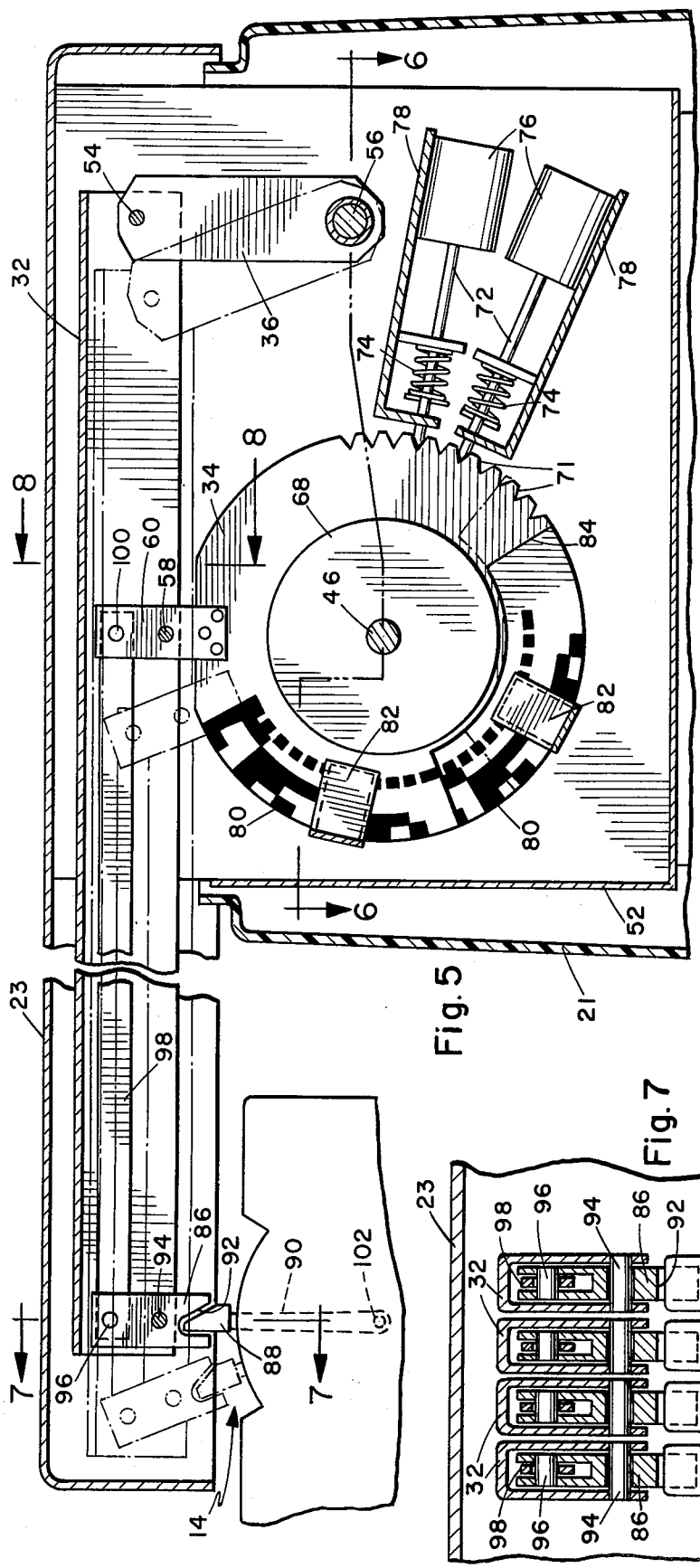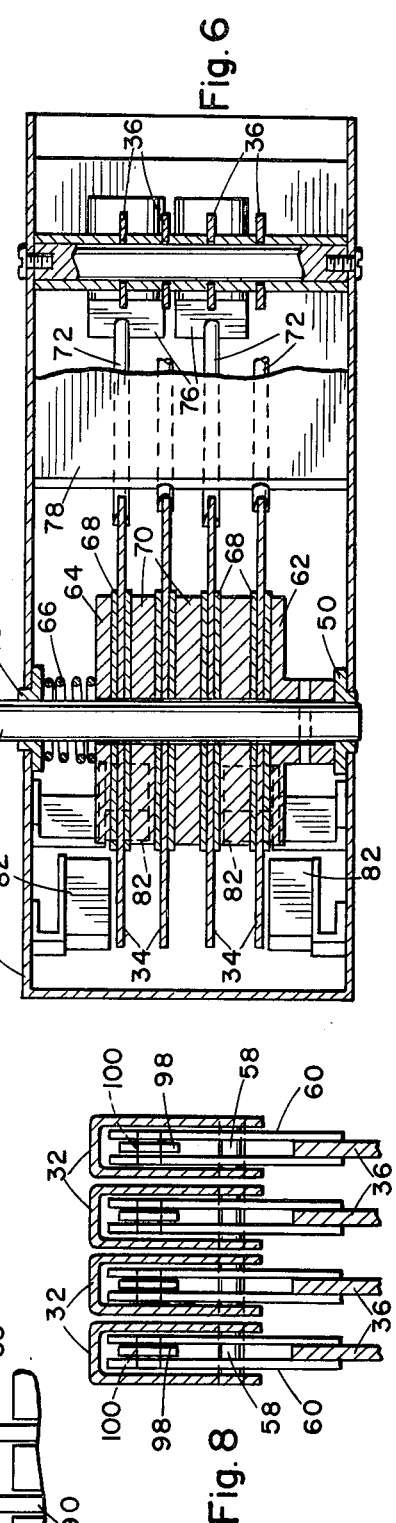

AUTOMATIC OPERATING SYSTEM FOR LEVER TYPE POSTAGE METERING MACHINE

BACKGROUND OF THE INVENTION

The present invention relates to postage metering machines and pertains particularly to an improved system for automating postage metering machines.

A great many semi-automatic postage metering machines are in use today for application of postage directly to letters or to tapes for application to packages. Such machines eliminate the necessity for obtaining a large inventory of postage stamps and individually selecting proper combination of stamps necessary for making up postage for a given package and applying them to the package. Such machines work quite satisfactory when a majority of letters or packages being posted require the same postage. This is because the machines approved by the U.S. Postage Service are designed to require manual selection of the postage required. Such machines are normally encased in such a manner as to prevent tampering with the controls thereof. Because of the strict control by the Postal Service it is not possible to automate such machines.

When such machines are utilized for the posting of a great many packages of varying size and of varying destination, a considerable number of errors can occur in the posting. The operator of the machine must individually select the required postage for each item. This requires a separate computation for each package. Although scales are available which automatically compute the applicable price associated with a given weight, this price must be specifically selected by the operator to be applied to the package. Errors made in the selection and application of postage to such packages can result in undue delay in delivery of packages due to under posting or frequent over payment of postage.

It is therefore desirable to have a system which is responsive to an automatic weighing and computing machine for automatically selecting the proper postage on lever type postage metering machine. It is desirable that such system be available which can operate the postage metering machine automatically without any modification thereto by following the natural motion of the ends of ends of the postage selecting levers.

SUMMARY AND OBJECTS OF THE INVENTION

Accordingly it is a primary object of the present invention to overcome the above problems of the prior art.

Another object of the present invention is to provide a system for automatically operating a lever type postage metering machine.

A further object of the present invention is to provide a new and improved system for automatically operating a lever type postage metering machine without modification of the metering machine.

Still another object of the present invention is to provide a new and improved system for operating a postage meter machine without permanent attachment thereto.

A still further object of the present invention is to provide a new and improved system that is responsive to the computer output of a scale for operating the selector levers of a lever type postage metering machine.

In accordance with the primary aspect of the present invention a machine is provided which is responsive to the output of a price computing scale for selectively operating the postage selection levers of a lever type postage machine. The machine includes a plurality of actuators for actuating the respective levers of the postage machine, with drive means for driving the actuators in selected directions in response to a coded input to the machine. The machine includes sensing means for sensing the position of the respective actuators in response to an input thereto for moving only those actuators not in the selected position.

BRIEF DESCRIPTION OF THE DRAWING

The above and other objects and advantages of the present invention will become apparent from the following description when read in conjunction with the drawings wherein:

FIG. 1 is a side elevational view of the apparatus coupled to a postage meter.

FIG. 2 is a top plan view of the apparatus.

FIG. 3 is an enlarged sectional view taken on lines 3—3 of FIG. 1.

FIG. 4 is a side elevational view as taken from the left hand side of FIG. 3.

FIG. 5 is an enlarged sectional view taken on line 5—5 of FIG. 2.

FIG. 6 is a sectional view taken on line 6—6 of FIG. 5.

FIG. 7 is a sectional view taken on line 7—7 of FIG. 5.

FIG. 8 is a sectional view taken on line 8—8 of FIG. 5.

DETAILED DESCRIPTION OF A PREFERRED EMBODIMENT

Figure 9:
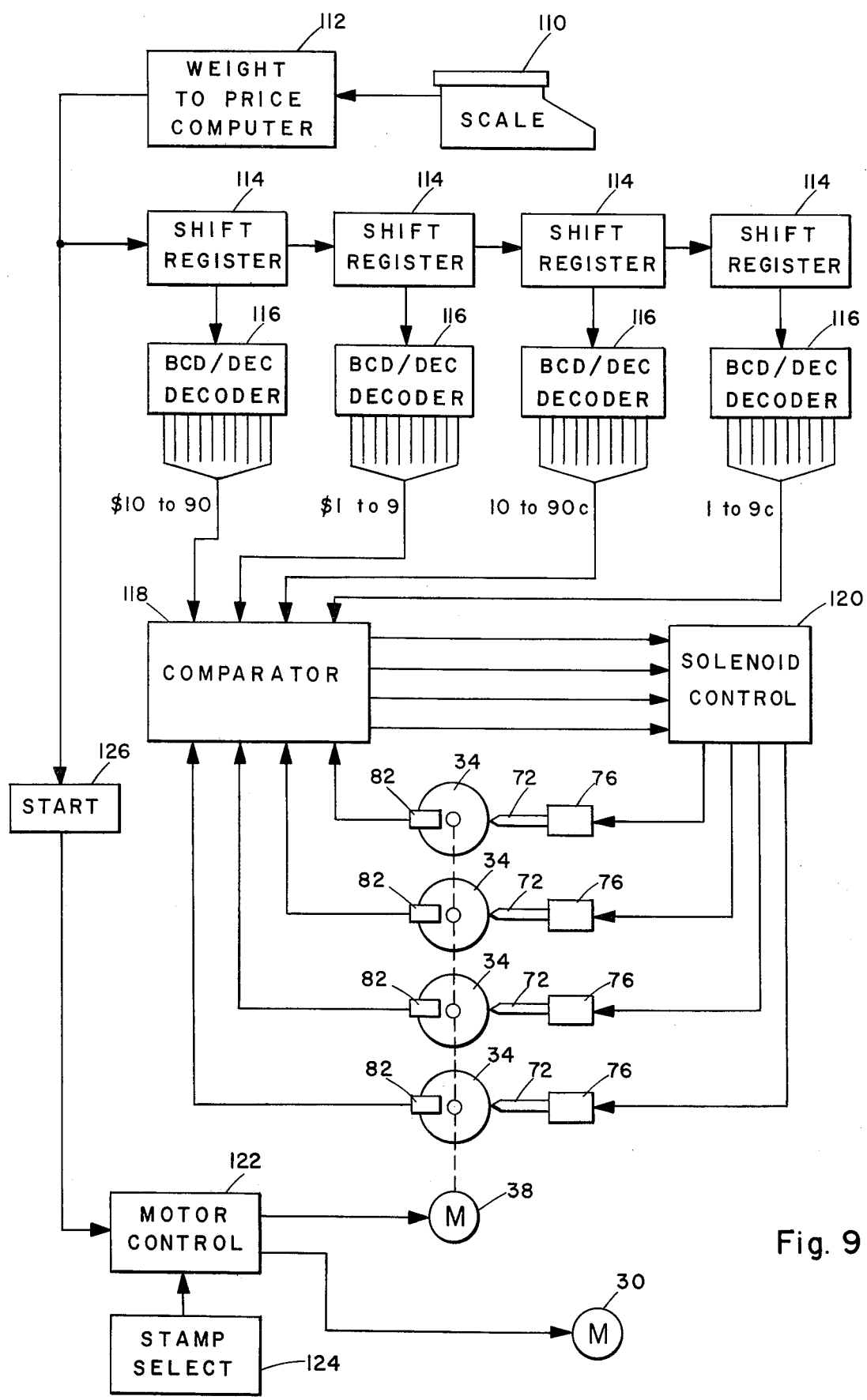
FIG. 9 is a block diagram of the control system of the apparatus.

Turning now to the drawings, particularly to FIG. 1, there is illustrated a typical lever type postage metering machine generally designated by the numeral 10 of the type produced and sold by the Pitney-Bowes Company and designated Model 5600. An exemplery embodiment of an operating machine in accordance with the present invention generally designated 12 is positioned in operative association with the postage metering machine 10 for operating the machine. The postage metering machine 10 is of the type having a plurality of levers located at or on a keyboard generally designated by the numeral 14 which are selectively actuated or positioned to select postage which is applied by imprinting on envelopes or stamps on a print support plate 16. A tape selector or trip lever 18 is operated to cycle the machine and imprint an adhesive stamp from a roll (not shown) from within the machine and dispenses the imprinted portion from a slot (not shown) in the vicinity of the plate 16. The machine may include a letter guide with automatic imprinting means for letters. The postage metering machine 10 is mounted on a suitable base 20, on which is also mounted the operating machine 12 for the postage metering machine.

As previously pointed out the postage metering machine 10 in order to be approved by the Postal Service is encased within a housing to prevent tampering with the internal mechanism thereof. Accordingly, it must be operated solely by means of the external control levers and button thereon in much the same manner as operated by an individual. Accordingly the operating machine or apparatus 12 is operably associated with the postage metering machine in a manner solely to manipulate the external controls thereof. The operating system includes the general mechanical operating apparatus 12 comprising a housing 21 for housing the main operating or actuating components of the system and extension housing 23 extending over the controls or levers of the postage metering machine 10 for housing a plurality of actuating members which actuate and/or engage and actuate the selector levers of the postage machine as will be described below.

The tape selector lever 18, sometimes termed the tape trip lever, when actuated cycles the machine to deliver an imprinted stamp or strip of tape which may be moistened for application directly to a package. This lever is utilized when stamps or tapes are selected for application to packages. When letters are imprinted in the machine they are fed directly through the letter feed and imprint plate with trip means within the machine for automatically imprinting the postage directly on the letter. The present machine includes an actuating apparatus for the tape trip lever 18 as best illustrated in FIGS. 3 and 4. This actuating apparatus includes a hook member 22 hooking over the lever arm of the lever 18 and a cable 24 attached to the hook and trailing over a pulley 26 to an actuator arm 28 of an actuating mechanism such as a solenoid 30. The solenoid 30 is controlled by the system in response to a signal fed thereto by the weight to price computer of the system to be described.

Turning back now to FIGS. 1 and 2 there is generally illustrated the general outline or layout of the specific mechanical actuating or operating apparatus of the present system. This system includes a plurality of actuators 32 mounted for general oscillatory motion on arms of a plurality of discs 34 and a plurality of links 36. Four actuators are shown for a standard four key postage meter. The discs 34 are driven by a reversible electric motor 38 through a belt and pulley arrangement including a pulley 40, a belt 42, and a pulley 44. The pulley 44 is secured to the end of a shaft 46 on which is rotatably mounted a plurality of the discs 34. The pulley 44 is drivingly connected to the end of the drive shaft 46 which is rotatably mounted such as in journal bearings 48 and 50 of a frame 52 as best seen in FIG. 6.

Turning now to FIG. 5 of the drawing a lever actuator 32 is shown pivotally mounted at a pin connection 54 on arm 36 which in turn is pivotally mounted on a shaft 56 in the frame 52. The actuating member 32 is also pivotally connected or pinned at 58 to an arm 60 on disc 34. The radius of the arms at 58 and 54 from the respective pivot points 46 and 56 are equal. The arm 60 is mounted on or secured to the disc 34 in any suitable manner such as by riviting, bolting, or the like and moves with the disc 34 in alternate directions on the shaft 46. The disc 34 is drivingly connected to the shaft 46 by means of a slipping disc or clutch arrangement including a pressure disc 62 on one end of the stack of discs and a pressure disc 64 on the opposite end, biased by means of a spring 66 toward the opposite disc. A plurality of friction plates or discs 68 are disposed within the arrangement to each side of each of the respective discs 34. A plurality of spacing discs 70 are disposed between the respective discs 68. Thus the discs 34 are frictionally driven by means of shaft 46 through these frictional clutch arrangement.

Each of the discs 34 includes a plurality of notches 71 along a portion of the outer edge thereof. These notches 71 are for receiving a latch means including a plunger 72 which is spring biased by a spring 74 into engagement with the notches 71. A solenoid 76 mounted on a suitable bracket 78 within the frame 52 supports the latch mechanism and retracts the plunger 72 when suitably activated. A latch mechanism is provided for each of the four discs illustrated. The latch mechanisms are staggered as shown for space considerations.

Each of the discs 34 include location code means 80 located along one side of the discs along an arcuate portion thereof. A code sensor device 82 is mounted within the frame 52 disposed in a proper position to sense the respective code elements indicating the respective position of the disc and the linkage associated therewith, the technique being well known. Each of the outer discs include a cutout portion 84 which permits location of a sensor 82 for sensing coded position means 80 on the inner disc.

The actuator means includes the actuator members 32 which are connected by means of a connecting member 86 to actuating tabs 88 on postage setting or selecting levers 90. The connecting member 86 includes a V-shaped cutout 92 which embraces the tab 88 for actuation thereof. The connecting member 86 is pivotally connected to the member 32 at a pin 94, and at pin 96 to a link 98 which is connected by pin means 100 at its opposite end to arm 60 on the disc 34. This parallelogram linkage rotates the connecting member 86 around in a fashion to keep alignment of the slot 92 with the tab member 88. The mounting of the actuating member 32 is that of a parallelogram linkage since lever arms 46/58, and 56/54 are the same, and these lever arms are the same as lever arm defined by the pivot point 102 of lever 90 and the pivot point 94 of the connecting member 86. Thus the connecting member 86 follows the natural motion of actuating tab 88 around in an arcuate path such as would the fingers of an individual actuating the lever. This permits the movement of the levers by the mechanism without any undue force or unnatural stresses thereon.

As best seen in FIG. 7 one of the actuating linkage arrangements 32 is provided for each of four postage selection levers 90. These actuating linkages are connected for engaging the tabs 88 on the respective selection levers. In the four lever arrangement the first lever is set to provide from 0 to 9 cents, the second lever in conjunction with the first lever to provide from 10 to 99 cents, the third lever in conjunction with the first two to provide from $1.00 to $9.99, and the fourth lever in conjunction with the first three for providing from $10.00 to $99.99. Other combinations of levers may be provided. Since each lever and actuator therefor is connected in the same manner and operates in the same manner single reference numerals have been applied to the similar parts in the system.

The control system for controlling this system is schematically illustrated in FIG. 9. The system includes an electronic type weighing scale 110 which provides a readout or signal, which is fed into a weight to price computer 112 programmed to give a signal indicating the correct amount of postage. The computer, usually incorporated in the scale itself, may be programmed to select postal zones and classes of mail within which the packages are sent. The computer output is in the form of serial binary bits of data corresponding to the postage amount. The binary data is then communicated or sequenced along shift registers 114. The data from the shift registers is entered into the binary to decimal decoders 116. The output from the decoder is, depending on the value, is then fed into the comparator 118, which compares the command output from the decoder and the position of the respective discs 34 indicated by the sensors 82. Should the position of a disc, which itself indicates the position of the associated selector lever, correspond to the decoded input to the comparator, that disc remains in its position. However, should the code differ from that indicated then a signal is sent to the solenoid control 120 for activation of selected one of the solenoids 76, for permitting rotation of the selected disc in a direction to obtain a comparison between the code input and the position of the respective discs. The motor control 122 may be activated directly or by output from the comparator. The motor 38 is oscillated once between extreme rotary positions during each operation, initiated by a start switch 126 which can be manually operated or incorporated as a function of the scale output. This would permit the machine to automatically actuate selected levers to their selected positions upon placing of a package upon scale 110. The motor would be activated only if a disparity should exist between the selected code and the position code as detected by the code sensors 82. When a disparity is signaled the solenoid control would actuate selected one of the solenoids 76 to permit the selected disc 34 to rotate to the desired position, at which time the latch 72 would be released by the solenoid to automatically latch the disc in the indicated position. The resultant movement of the linkage mechanism selectively sets the respective postage selector lever.

When an adhesive stamp is required, as for a package which cannot be passed through the postage meter, a stamp select control 124 is operated to actuate motor 30 and pull down lever 18. The stamp select control 124 can be manually operated or incorporated in scale 110 for automatic repetition. Motor control 122 serves to operate both motors 30 and 38.

Thus from the above description it is seen that an automatic operating machine or system is provided for operation of lever type postage meters. The system operates automatically in response to the placement of the package upon a scale. This provides a direct readout and printout of postage in response to placement of a package on the scales. This eliminates error that may result from manual selection of the specific indicated postage. While the present system has been illustrated and described by means of a specific embodiment it is to be understood that numerous changes and modifications may be made therein without departing from the spirit and scope of the invention as defined in the appending claims.

Having described our invention, we now claim:

1. In a machine for operating postage selector levers of a lever type postage metering machine, the combination comprising:
    operating linkage means for each selector lever on said postage machine, said linkage means comprising first and second spaced apart link means connected by an elongated bar and mounted for oscillatory motion about spaced apart fixed centers and thereby defining a four bar linkage,
    lever engaging means mounted on one end of said operating linkage means, and movable in an arc following the end of said lever about the pivot axis of said lever, said lever engaging means comprising a V-shaped notch formed in one end of a link member pivotally connected to said bar for engaging the end of said selector lever, and
    control means responsive to an input selection signal for moving selected ones of said operating linkage means for movement of said levers to selected positions, said control means comprising a drive member mounted on a rotatable drive shaft for each of said operating linkage means, and a reversible motor connected to said shaft for driving said shaft in alternate directions, means drivingly connecting said shaft to said drive members, and means for individually latching said drive members in selected positions.

2. The combination of claim 1, wherein said means drivingly connecting said shaft to said drive member comprises friction means including a plurality of friction discs mounted on said shaft and frictionally engaging said drive member.

3. The combination of claim 1, wherein said drive member comprises a disc, and one of said first and second spaced apart arms is mounted on said disc.

4. A machine for operating postage selector levers of a lever type postage metering machine comprising:
    operating linkage means for each selector lever on said postage machine, said operating linkage means comprising first and second spaced apart arms mounted for oscillatory motion about spaced apart fixed centers and pivotally connected to an elongated bar and thereby defining a four bar linkage mounted for oscillating motion;
    a lever engaging link member pivotally mounted on one end of said operating linkage means and having a V-shaped notch formed in one end thereof for engaging the end of said selector lever, and said link member movable in an arc following the end of said lever about the axis of said lever; and
    control means responsive to an input selection signal for selectively moving selected ones of said operating linkage means to selected positions for movement of said levers to selected positions, said control means including drive means comprising a disc rotatably mounted on a rotatable drive shaft and one of said arms is mounted on a disc for each of said operating linkage means, a reversible motor connected to said shaft for driving said shaft in alternate directions, means drivingly connecting said shaft to said drive members, and means for individually latching said drive members in selected positions, scale means responsive to a weight thereon for generating a signal, and computer means responsive to said signal for computing postage required by said weight and controlling said machine for selecting and printing said computed postage.

5. The machine of claim 4 wherein said control means includes position indicating means on said discs for indicating the position of said levers and sensing means for sensing said position.

6. The machine of claim 5, wherein said control means includes comparator means for comparing said computed postage to the postage indicated by said levers, and latch control means for controlling said latch means for releasing drive members not in said computed postage position and latching said drive members when moved to said position.

7. A system for operating a lever type postage metering machine having a plurality of postage selector levers, said system comprising:
    an electronic scale for weighing a package and generating a signal that is related to the actual price data as a function of the weight of a package on the scale, a machine having a plurality of operating members for selectively operating postage selector levers on a postage metering machine, control means comprising computer means responsive to said signal for computing postage required by said weight and operating said members for shifting selected ones of said levers to correspond to said signal and printing said computed postage, and said control means includes comprator means for comparing said computed postage to the postage indicated by said levers, and latch control means for releasing operating members not in said computed postage position and latching said drive members when moved to said position.

8. The system of claim 7 wherein said machine comprises:
operating linkage means for each selector lever on said postage machine;
said operating linkage means comprise an elongated bar mounted for oscillating motion;
lever engaging means mounted on one end of said operating linkage means, and moveable in an arc following the end of said lever about the axis of said lever.

9. The system of claim 8, wherein said linkage means comprises first and second spaced apart arms mounted for oscillatory motion about spaced apart fixed centers and pivotally connected to said bar and thereby defining a four bar linkage.

10. The system of claim 9, wherein said lever engaging means comprises a link member pivotally connected to said bar, and having a V-shaped notch formed in one end of said link member for engaging the end of said lever.

11. The system of claim 7 wherein said control means includes drive means comprising drive member rotatably mounted on a rotatable drive shaft for each of said operating linkage means,
a reversible motor connected to said shaft for driving said shaft in alternate directions, means drivingly connecting said shaft to said drive members, and means for individually latching said drive members in selected positions.

12. The system of claim 11, wherein said means drivingly connecting said shaft to said drive member comprises friction means including a plurality of friction discs mounted on said shaft and frictionally engaging said drive member.

13. The system of claim 12, wherein said drive member comprises a disc, and one of said first and second spaced apart arms is mounted on said disc.

* * * * *